United States Patent
Keller

(10) Patent No.: US 8,119,195 B2
(45) Date of Patent: Feb. 21, 2012

(54) MIXTURE CONTAINING QUATERNARY AMMONIUM COMPOUND AND ITS USE

(75) Inventor: Adrian Keller, Rupperswil (CH)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 12/678,980

(22) PCT Filed: Sep. 15, 2008

(86) PCT No.: PCT/EP2008/062218
§ 371 (c)(1),
(2), (4) Date: Jul. 9, 2010

(87) PCT Pub. No.: WO2009/037218
PCT Pub. Date: Mar. 26, 2009

(65) Prior Publication Data
US 2010/0267874 A1    Oct. 21, 2010

(30) Foreign Application Priority Data
Sep. 18, 2007  (EP) ..................................... 07116675

(51) Int. Cl.
C04B 40/00   (2006.01)
C04B 28/00   (2006.01)
C08K 13/02   (2006.01)

(52) U.S. Cl. ............ 427/220; 524/2; 524/186; 52/741.1
(58) Field of Classification Search .................. 524/186, 524/2; 427/220; 52/741.1
See application file for complete search history.

(56) References Cited

U.S. PATENT DOCUMENTS

| | | | |
|---|---|---|---|
| 4,954,372 A * | 9/1990 | Sako et al. .................. | 427/388.2 |
| 6,080,387 A * | 6/2000 | Zhou et al. ....................... | 424/45 |
| 6,756,437 B1 | 6/2004 | Xue et al. | |
| 6,923,857 B2 | 8/2005 | Constantinou et al. | |
| 2005/0106336 A1 | 5/2005 | Ong et al. | |
| 2009/0223416 A1 | 9/2009 | Aberle et al. | |

FOREIGN PATENT DOCUMENTS

| | | | |
|---|---|---|---|
| DE | 26 36 271 | | 3/1977 |
| DE | 33 21 027 | | 12/1984 |
| EP | 0 894 821 | | 2/1999 |
| EP | 1 767 506 | | 3/2007 |
| GB | 1 088 485 | | 10/1967 |
| GB | 1 539 434 | | 1/1979 |
| GB | 2 294 459 | | 5/1996 |
| GB | 2 343 448 | | 5/2000 |
| JP | 76014893 B | * | 5/1976 |
| JP | 04095028 A | * | 3/1992 |
| JP | 09268105 A | * | 10/1997 |
| JP | 2003-245604 | | 9/2003 |
| JP | 2003245604 A | * | 9/2003 |
| WO | WO 01/18081 | | 3/2001 |
| WO | WO 01/72658 | | 10/2001 |
| WO | WO 2005/014256 | | 2/2005 |
| WO | WO 2005/097699 | | 10/2005 |
| WO | WO 2006/094528 | | 9/2006 |
| WO | WO 2006/094809 | | 9/2006 |

OTHER PUBLICATIONS

Din 53015, Viscometry—Measurement of viscosity using the Hoeppler falling-ball viscometer, Feb. 2011, English-language translation provided.

* cited by examiner

*Primary Examiner* — Kelechi Egwim
(74) *Attorney, Agent, or Firm* — Kenyon & Kenyon LLP

(57) ABSTRACT

The present invention pertains to the use of quaternary organic ammonium compounds for the reduction of efflorescence in building materials. In addition, a mixture containing at least one quaternary organic ammonium compound and at least one water-soluble organic polymer and, optionally, further additives is described. The mixture according to the invention can be prepared by a) at least one quaternary organic ammonium compound and at least one water-soluble organic polymer being mixed with one another in water and the obtained aqueous mixture optionally being subsequently dried, or b) at least one powdery quaternary organic ammonium compound and at least one powdery water-soluble organic polymer being mixed with one another, or c) at least one liquid and/or dissolved quaternary organic ammonium compound being applied on at least one powdery water-soluble organic polymer, in particular by means of spraying, adsorption, mixing, fluidized bed drying and/or granulation.

19 Claims, No Drawings

MIXTURE CONTAINING QUATERNARY AMMONIUM COMPOUND AND ITS USE

REFERENCE TO RELATED APPLICATION(s)

This application is the U.S. National Phase of PCT/EP2008/062218 filed on Sep. 15, 2008.

FIELD OF THE INVENTION

The present invention pertains to the use of quaternary organic ammonium compounds for the reduction of efflorescence in building materials. Furthermore, the present invention pertains to mixtures containing quaternary organic ammonium compounds, processes for preparation of the mixtures, and advantageous use thereof.

BACKGROUND OF THE INVENTION

Efflorescence is known in particular in the case of cement-based building materials such as concrete, plasters, and mortars. The skilled person means by efflorescence whitish deposits on the surface, which are formed above all as a result of liberated calcium hydroxide, which continues to react by means of carbon dioxide from the air to calcium carbonate. Further salt deposites may also be included in this process. Although such efflorescence as a rule does not have any noteworthy effect on the physical properties of the substrate, it is still considered to be very annoying especially in the case of colored or grey surfaces.

To solve this problem several suggestions are made in WO 2001/72658 A1, WO 2005/097699 A1, and also in WO 2006/094528 A1 and WO 2006/094809 A1 to formulate the mortar composition accordingly by means of specific selection of the mineral binder components. It is true that as a result of this the efflorescence could be reduced, but for the formulator the possibility of setting the property profile as desired precisely by changing these components, such as for instance setting behavior, pot life, open time and/or shrinkage behavior, of the mortar to be formulated, is greatly reduced.

In another approach additives are mentioned the addition of which to hydraulically setting building materials should prevent or reduce efflorescence. Thus for instance GB 1,088,485 A mentions that an aqueous dispersion of a mixture of tall oil resin and high-boiling fractions of tall oil, in part also mixed with asphalt, can either be mixed into the concrete or be applied on the surface subsequently. The process for the preparation of such dispersions is very complicated and hence expensive, with the dark to black color of the mixture substantially restricting its range of application. In DE 33 21 027 A1 a process is described in which inter alia also a reduction of efflorescence and a decrease of the water absorption should occur. In this process use is made of terpene polymers, in particular of liquid low-molecular terpenes, alone or mixed with other terpene hydrocarbons, which are added to the cement-containing building materials in an amount of 0.1-10 wt. %. The addition of the terpene-based compounds takes place in emulsified form or by spraying of liquid or dissolved terpenes, which renders its use in inter alia dry mortars impossible. Furthermore, EP 1 767 506 A1 describes a water-redispersible powder for the reduction of efflorescence in hydraulically set building materials, consisting of at least one organic component and at least one water-soluble organic polymeric protective colloid, where the organic component contains at least one compound with a cyclic group which is fully or partially saturated, has a melting point of about −20 to 250° C. and a molecular weight of about 100 to 10,000, and forms a stable dispersion with the water-soluble organic polymeric protective colloid in water.

GB 2,343,448 A describes concrete for walls with improved resistance to freeze-thaw, where also additives to control efflorescence can be added thereto. As such additives are mentioned calcium stearate, fatty acids and the salts thereof, polyvinyl alcohol, water-based latices, silanes, siloxanes and mixtures thereof. In order to give the concrete for walls sufficient strength, small amounts of a betaine are added.

US 2005/0106336 A1 and WO 2005/014256 A1 describe composite materials which are suitable for the production of cement-based slabs, where a material with antimicrobial properties is added. As antimicrobial compounds organic and inorganic agents may be used. Quaternary ammonium compounds are a preferred class. Efflorescence is not mentioned.

In published application DE 26 36 271 a process for the preparation of a light mortar with a predominant volume share of expanded perlite is described. To this are besides perlite also added cement and in about the same amount calcium hydroxide or calcium oxide and a tenside. The tenside to be used preferably is of an anionic nature, but can also be of a cationic or non-ionic nature. There is no mention of efflorescence.

Because of the substantially different fields of application of mortars and concretes, these also have a very different composition. It should be added that for instance another cement, be it of a different production type or a different quality, can show quite different efflorescence behavior. The climatic conditions also play an important part in whether an applied building material has a tendency to efflorescence or not. In accordance with the plurality of different compositions of concrete and mortar it has become apparent that it is of great advantage when the formulator can choose from different materials for the reduction of efflorescence, in order to select the most suitable product for the specific recipe in each case.

Thus the problem presented itself of providing an additive which eliminates or at least very strongly reduces the efflorescence of building materials, in particular in hydraulically setting building materials, such as for instance cement-based mortars and concretes. Moreover, it should be possible for the additive to be present in powder form, in particular for the formulation of dry mortars, in order to avoid the well-known disadvantages of liquid raw materials such as for instance lack of resistance to freeze-thaw or limited storage stability without the addition of toxic biocides, and to make possible simple dosing in the case of dry mortar formulations. Moreover, it is essential that this additive can be easily introduced into the mortar matrix which is mixed or to be mixed with water, without special mixing processes having to be taken into account. The additive should be very readily wettable, redispersible or soluble in the mortar mixture and should have easy and homogeneous distribution in the matrix. It is also important that no disadvantageous or quite different mortar properties are obtained with the additive, i.e. it should be possible to introduce the additive into existing mortar formulations without the properties thereof being altered, except for the desired substantial reduction of the efflorescence effect. Moreover, it to should be possible to dose the additive independent of other mortar raw materials, which allows the formulator a very high flexibility. Further it is important that the raw material and preparation costs of the dry mortar do not change or change only to a slight extent because of the additive.

SUMMARY OF THE INVENTION

The present invention provides the use of quaternary organic ammonium compounds in building materials for the reduction of efflorescence in building materials.

DETAILED DESCRIPTION OF THE INVENTION

Surprisingly, the complex problem could be solved through the use of quaternary organic ammonium compounds for the reduction of efflorescence in building materials.

The present invention in addition provides a mixture containing at least one quaternary organic ammonium compound and at least one water-soluble organic polymer and, optionally, further additives.

Generally it is advantageous when the quaternary organic ammonium compound is not adsorbed on organic surfaces, in particular not on surfaces of polymer particles such as latex or dispersions, and thus for instance is not added already before and/or during the preparation of such polymers via known processes such as emulsion polymerization, but can move independently of water-soluble organic polymers in building materials, when these have been stirred and/or mixed with water, or in applied building materials.

According to the invention, in building materials all quaternary organic ammonium compounds can be used, provided that they reduce the efflorescence to a suitable degree in the building material in question and do not lead to any or only negligible disadvantageous effects such as for instance a time delay of cement hydration or a deterioration of mortar processability.

As quaternary organic ammonium compounds, which are also known as QACs, for the use according to the invention and for the mixture according to the invention preferably linear, branched and/or cyclic alkylammonium compounds, imine compounds, N-alkylated heteroaromatic compounds and/or amphoteric compounds are used.

Preferred alkylammonium compounds are those of the amine type, in which case one or several quaternary organic ammonium compounds can be used simultaneously. As a rule it is especially preferred that at least one quaternary organic ammonium compound is of the formula (1), (2) and/or (3)

$$(N^+R_1R_2R_3R_4)A^- \quad (1)$$

$$(N^+R_1R_2R_3R_4)_2A^{2-} \quad (2)$$

$$(N^+R_1R_2R_3R_4)_3A^{3-} \quad (3)$$

wherein $R_1$, $R_2$, $R_3$, and $R_4$ represent organic groups with at least one C-atom and may be the same or different, and $A^-$ stands for a monovalent, $A^{2-}$ for a divalent, and $A^{3-}$ for a trivalent anion. Typical representatives of this class of alkylammonium compounds are alkyltrimethyl ammonium salts such as for instance cetyltrimethylammonium bromide or chloride, dialkyldimethyl-ammonium salts, benzalkonium salts such as for instance benzalkonium chloride, ester quats, which generally are based on quaternary triethanol-methylammonium or quaternary diethanol-dimethyl-ammonium compounds, ethoxylated quaternary organic ammonium compound, as well as organobentonites.

Preferred imine compounds are of the type $R_3\!=\!NR_1R_2^+$ $A^-$, with imidazolium compounds being particularly preferred. Preferred N-alkylated heteroaromatic compounds are for instance pyridinium compounds. Preferred amphoteric compounds are for instance betaines or lecithines, with phospholipids such as for instance phosphatidyl cholines or sphingocholines being especially preferred.

Often it is preferred that at least one of the organic groups $R_1$, $R_2$, $R_3$ and/or $R_4$ of the quaternary organic ammonium compound has a saturated and/or unsaturated $C_1$- to $C_4$-alkyl group, in particular a methyl, ethyl, propyl, butyl is group. Particularly preferred are one or several methyl and/or ethyl groups.

Often it is advantageous that at least one of the organic groups $R_1$, $R_2$, $R_3$ and/or $R_4$ is at least one saturated and/or unsaturated $C_6$- to $C_{50}$-alkyl and/or heteroalkyl group, preferably a $C_6$- to $C_{40}$-alkyl and/or heteroalkyl group, in particular a $C_8$- to $C_{30}$-alkyl and/or heteroalkyl group, and more preferably a $C_8$- to $C_{24}$-alkyl and/or heteroalkyl group, which is linear, branched, cyclic and/or aromatic.

When there is a separate anion present, the quaternary ammonium compounds typically are present as quaternary ammonium salts. In general in order to obtain these quaternary ammonium salts, all commonly known anions can be used. As monovalent anions $A^-$ fluoride, chloride, bromide, iodide, hydroxide, methyl sulfate, hydrogen carbonate and/or dihydrogen phosphate are particularly suitable, as divalent anions $A^{2-}$ sulfate, carbonate and/or hydrogen phosphate are particularly suitable, and as trivalent anion $A^{3-}$ phosphate is particularly suitable.

Non-limiting examples of quaternary organic ammonium compounds are alkyltrialkyl ammonium salts such as for instance alkyltriethyl ammonium salts and/or alkyltrimethyl ammonium salts, in particular dodecyltrimethyl ammonium salts, cetyltrimethyl ammonium salts, behenyltrimethyl ammonium salts, caprontrimethyl ammonium salts, capryltrimethyl ammonium salts, caprinetrimethyl ammonium salts, lauryltrimethyl ammonium salts, myristyltrimethylethyl ammonium salts, cetryltrimethyl ammonium salts, stearyltrimethyl ammonium salts, dodecyltriethyl ammonium salts, cetyltriethyl ammonium salts, behenyltriethyl ammonium salts, caprontriethyl ammonium salts, capryltriethyl ammonium salts, caprinetriethyl ammonium salts, lauryltriethyl ammonium salts, myristyltriethylethyl ammonium salts, cetryltriethyl ammonium salts, stearyltriethyl ammonium salts, as well as the methyldiethyl, dimethylethyl, and triethyl-analogous compounds thereof, dialkyldialkyl ammonium salts such as for instance dialkyldimethyl ammonium salts and is dialkyldiethyl ammonium salts, in particular didodecyldimethyl ammonium salts, dicetyldimethyl ammonium salts, dibehenyldimethyl ammonium salts, dicaprondimethyl ammonium salts, dicapryldimethyl ammonium salts, dicaprinedimethyl ammonium salts, dilauryldimethyl ammonium salts, dimyristyldimethyl ammonium salts, dicetryldimethyl ammonium salts, distearyldimethyl ammonium salts, as well as the methylethyl and diethyl-analog compounds thereof, including mixed forms such as for instance caprylstearyl-methylethyl ammonium salts or laurylcaprinemethylethyl ammonium salts, trialkylmethyl ammonium salts and trialkylethyl ammonium salts such as for instance tridodecylmethyl ammonium salts, tricetylmethyl ammonium salts, tribehenylmethyl ammonium salts, tricapronmethyl ammonium salts, tricaprylmethyl ammonium salts, tricaprinemethyl ammonium salts, trilaurylmethyl ammonium salts, trimyristylmethylethyl ammonium salts, tricetrylmethyl ammonium salts, tristearylmethyl ammonium salts as well as the methylethyl and diethyl-analog compounds thereof, including the above mixed forms such as for instance capryistearylmyristylmethyl ammonium salts or laurylcaprinbehenylethyl ammonium salts, benzyltrialkyl ammonium salts such as for instance benzalkonium salts and alkyldimethylbenzyl ammonium salts, in particular dodecyldimethylbenzyl ammonium salts, cetyldimethylbenzylammonium salts, behenyldimethylbenzyl ammonium salts, caprondimethylbenzyl ammonium salts, capryldimethylbenzyl ammonium salts, caprinedimethylbenzyl ammonium salts, lauryldimethylbenzyl ammonium salts, myristyldimethylbenzyl ammonium salts, cetryldimethylbenzyl ammonium salts, stearyldimethylbenzyl ammonium salts, alkyldimethylbenzyl ammonium salts such as for instance benzyldimethylmyristyl ammonium salts, benzyldimethylcetyl ammonium salts, benzyldimethylstearyl ammonium salts, benzylmethylethylstearyl ammonium salts, and/or alkylpyridinium salts such as for instance lauryl or cetylpyridinium salts, but also alkylisoquinolinium salts, dialkylmorpholinium salts. Furthermore, also benzethonium salts, imidazolium compounds and/or imidazoline derivatives can be used.

As quaternary organic ammonium compounds also esterquats can be used. The esterquats for use herein refer to known substances which have at least one ester function as well as at least one quaternary ammonium group as structural element, in particular quaternised ester salts of fatty acids with triethanolamine, quaternised ester salts of fatty acids with diethanol alkylamines, and quaternised ester salts of fatty acids with 1,2-dihydroxypropyl dialkylamines. Such products are sold for instance under the trademarks Stepantex®, Dehyquart®, and Armocare®. The products Armocare® VGH-70, an N,N-bis(2-palmitoyloxyethyl)dimethylammonium, and Dehyquart® F-75, Dehyquart® C-4046, Dehyquart® L80, and Dehyquart® AU-35 are examples of such esterquats.

In addition, also betaine compounds can be used, with use preferably being made of synthetic and/or naturally occurring compounds with the atom grouping $R_3N^+$—$CH_2$—X—$COO^-$, such as for instance betaine ($Me_3N^+$—$CH_2$—$COO^-$) and carnitine ($Me_3N^+$—$CH_2$—$CHOH$—$CH_2$—$COO^-$) wherein Me is methyl, and/or alkylamidopropyl betaine.

The alkyl groups of the quaternary organic ammonium compounds can also be substituted with functional groups, for instance with hydroxyl, amine, amide, imine, carbonyl, carboxyl, silane, siloxane, ether, thioether, ester, nitrile, sulfonic acid, epoxide, carboxylic anhydride, carbonyl groups and/or halogens such as F or Cl. Non-limiting examples are alkyldimethylhydroxyethyl ammonium salts and/or alkylamide-ethyltrimethyl ammonium ethersulfates, to mention but a few examples.

The molecular weight of the saturated and/or unsaturated $C_6$- to $C_{50}$-alkyl and/or heteroalkyl group typically is 77 or higher, preferably 100 or higher, in particular 115 or higher. In addition, it is advantageous when the molecular weight thereof is about 2,000 or lower, preferably about 1,000 or lower, in particular about 700 or lower.

The molecular weight of preferred quaternary organic ammonium compounds typically is about 5,000 or lower, in particular about 2,000 or lower, and more preferably about 1,000 or lower.

The mixture according to the invention contains at least one water-soluble organic polymer. This is typically a synthetic polymer and/or a biopolymer such as a polysaccharide, which can be a natural and/or a synthetically prepared polysaccharide. The water-soluble organic polymer may optionally also be synthetically modified. As a rule the water-soluble organic polymers, provided they are not dissolved, are solids at room temperature and are preferably high-molecular weight compounds. When several water-soluble organic polymers are used, it is also possible to use a combination of one or several natural compounds and one or several synthetically prepared compounds.

The water-soluble organic polymer according to the invention often has no or only a weak ionic character. However, it is often helpful when the water-soluble organic polymer has no or only a small proportion of carboxyl groups.

Polysaccharides and derivatives thereof which are preferred for use are cold water-soluble polysaccharides and polysaccharide ethers such as for instance cellulose ethers, starch ethers (amylose and/or amylopectin and/or the derivatives thereof), guar ethers and/or dextrins. Also, use can be made of synthetic polysaccharides such as anionic, non-ionic or cationic heteropolysaccharides, in particular xanthan gum or wellan gum. The polysaccharides can be, but do not have to be, chemically modified, for instance with carboxymethyl, carboxyethyl, hydroxyethyl, hydroxypropyl, methyl, ethyl, propyl, sulfate, phosphate and/or long-chain alkyl groups. Further natural stabilizing systems are alginates, peptides and/or proteins such as for instance gelatine, casein and/or soy protein. Particularly preferred are dextrins, starch, starch ether, casein, soy protein, gelatine, hydroxyalkyl cellulose and/or alkylhydroxyalkyl cellulose.

Synthetically prepared water-soluble organic polymers can consist of one or several protective colloids, for instance one or several polyvinyl pyrrolidones and/or polyvinyl acetals with a molecular weight of 2,000 to 400,000, fully or partially saponified, and/or amino group, carboxylic acid group and/or alkyl groups-modified polyvinyl alcohols with a degree of hydrolysis of preferably about 70 to 100 mol. %, in particular of about 80 to 98 mol. %, and a Höppler viscosity in a 4% aqueous solution of preferably 1 to 50 mPas, in particular about 3 to 40 mPas (measured at 20° C. in accordance with DIN 53015), as well as melamine formaldehyde sulfonate, naphthaline formaldehyde sulfonate, block copolymerisates of propylene oxide and ethylene oxide, styrene-maleic acid and/or vinyl ether-maleic acid copolymers. High-molecular weight oligomers can be non-ionic, anionic, cationic and/or amphoteric emulsifiers such as for instance alkyl sulfonates, alkylaryl sulfonates, alkyl sulfates, sulfates of hydroxylalkanols, alkyl and alkylaryl disulfonates, sulfonated fatty acids, sulfates and phosphates of polyethoxylated alkanols and alkyl phenols as well as esters of sulfosuccinic acid, quaternary alkylammonium salts, quaternary alkyl-phosphonium salts, polyaddition products such as polyalkoxylates, for instance adducts of 5 to 50 mol ethylene oxide and/or propylene oxide per mol of linear and/or branched $C_6$- to $C_{22}$-alkanols, alkyl phenols, higher fatty acids, higher fatty acid amines, primary and/or secondary higher alkylamines, with the alkyl group preferably being a linear and/or branched $C_6$- to $C_{22}$-alkyl group. Particularly preferred are synthetic stabilizing systems, in particular partially saponified, optionally modified, polyvinyl alcohols, in which case it is possible to use one or several polyvinyl alcohols in combination, optionally with small amounts of suitable emulsifiers. Preferred synthetic stabilizing systems are in particular modified and/or unmodified polyvinyl alcohols with a degree of hydrolysis of 80 to 98 mol. % and a Höppler viscosity in a 4% aqueous solution of 1 to 50 mPas, and/or polyvinyl pyrrolidone.

The weight ratio of the quaternary organic ammonium compound to the water-soluble organic polymer depends above all on the materials used and the effects to be achieved. It can be from about 99:1 to about 1:99, preferably from about 90:10 to about 10:90, in particular from about 75:25 to about 25:75.

The mixture according to the invention is a powder, a granulate, an aqueous solution or an aqueous dispersion.

As a powder or granulate it is generally readily redispersible or soluble in water. The mean size of the powder or granulate particles typically is at least about 10 μm or more, preferably about 30 μm or more, in particular about 50 μm or more, but typically should be at most 10 mm or less, preferably about 4 mm or less, in particular about 1 mm or less. In addition, it is advantageous when the powder or granulate according to the invention is readily flowable, block- and storage-stable. When the mixture according to the invention is an aqueous solution or an aqueous dispersion, the solids content generally is about 10 to 75 wt. %, in particular about 25 to 65 wt. %.

The mixture according to the invention can also contain further additives. The amount of additives, based on the sum of the quaternary organic ammonium compound(s) and the water-soluble organic polymer, is not subject to any particular limits. Thus for instance it can be very small for surface-active substances and lie within the limits of about 0.01 wt. % or more, in particular of about 0.1 wt. % or more, and preferably of about 1 wt. % or more. On the other hand, it is also possible to admix considerably larger proportions of additives with the mixtures according to the invention, such as for instance with respect to fillers or water-redispersible dispersion powders based on water-insoluble film-forming polymers. In such cases for one part of the mixture according to the invention up to about 1,000 parts, in particular up to about 500 parts, and to preferably up to about 100 parts of further additives can be added. However, when the mixture according to the invention is an aqueous solution or an aqueous dispersion, it can often be an advantage when not more than about 100 parts, in particular not more than about 20 parts, and preferably not more than about 5 parts, based on one part of the solids content of the mixture according to the invention, of further additives are added.

There are no limits as to the nature of the further additives, as long as they do not enter into any undesired reactions. Often they may have an important function in the application of the mixture according to the invention, but this is not necessary. When the mixture according to the invention is a powder, it is often advantageous when the additive(s) is/are also in powder form, although it is also possible to add liquid additives. This then preferably takes place before or during drying. Thus for instance also further organic polymers can be added, which are water-soluble and/or water-insoluble.

Preferred additives are powdery and/or liquid defoamers, wetting agents, alkyl, hydroxyalkyl and/or alkylhydroxyalkyl polysaccharide ethers such as cellulose ethers, starch ethers and/or guar ethers, with the alkyl and hydroxyalkyl group typically being a $C_1$- to $C_4$-group, synthetic polysaccharides such as anionic, non-ionic or cationic heteropolysaccharides, in particular xanthan gum or wellan gum, cellulose fibres, dispersing agents, rheology control additives, in particular superplasticisers, thickeners and/or casein, hydratation control additives, in particular setting accelerators, solidification accelerators and/or setting retarders, air entraining agents, polycarboxylates, polycarboxylate ethers, polyacrylamides, fully and/or partially saponified and optionally modified polyvinyl alcohols, polyvinyl pyrrolidones, polyalkylene oxides, and polyalkylene glycols, with the alkylene group typically being a $C_2$- and/or $C_3$-group, among which block copolymers are also counted, dispersions and water-redispersible dispersion powders based on water-insoluble film-forming polymers such as for instance based on vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene, hydrophobic agents such as silanes, silane esters, siloxanes, silicones, fatty acids and/or fatty acid esters, thickeners, fillers and/or aggregates such as quartz and/or carbonatic sands and/or dusts such as for instance quartz sand and/or limestone dust, carbonates, silicates, layered silicates, precipitated silicas, lightweight fillers such as hollow microspheres of glass, polymers such as for instance polystyrene spheres, alumosilicates, silicon oxide, aluminium-silicon oxide, calcium-silicate hydrate, silicon dioxide, aluminium-silicate, magnesium-silicate, aluminium-silicate hydrate, calcium-aluminium-silicate, calcium-silicate hydrate, aluminium-iron-magnesium-silicate, calcium-metasilicate and/or volcanic slag, as well as pozzolanes such as metakaolin and/or latent hydraulic components. Particularly preferred additives are polymer dispersions, dispersion powders, polysaccharide ethers, superplasticisers, and hydrophobic agents, in particular silanes, silane esters, fatty acids and/or fatty acid esters. In addition, further additives for the reduction of efflorescence can also be added.

As silanes, silane esters, silicones and/or siloxanes in principle all organosilicon compounds can be used. However, it is advantageous, although not necessary, that they are present in the liquid or solid form and the boiling point at normal pressure of the used organosilicon compound is not too low, preferably about 100° C. or higher. The organosilicon compounds can be soluble, insoluble or only partially soluble in water. Preferred organosilicon compounds are in particular mixtures of alkylalkoxy siloxanes of the chemical formula $(R'')Si(OR''')_xO_y$ with $0<x<2$ and $0.5<y<1.5$, preferably $1.0<x<2.0$ and $0.5<y\leq1.0$, with the proviso that $(2y+x)=3$, and the groups $R''$ may be the same or different and $R''$ represents a linear, branched or cyclic alkyl group with 1 to 18 C-atoms, further groups $R'''$ may be the same or different and $R'''$ represents a hydrogen or a linear or branched alkyl group with 1 to 4 C-atoms, preferably H, methyl, ethyl, propyl. Additionally, tetraalkoxy silanes, alkyltrialkoxy silanes, dialkyl-dialkoxy silanes are preferred organosilicon compounds, in which case linear to and/or branched $C_1$- to $C_{20}$-alkyl groups can be present as alkyl groups and the alkoxy groups can be present as linear and/or branched $C_1$- to $C_{10}$-alkoxy groups, with methoxy, ethoxy and/or i-propoxy groups preferably being used in the latter case. Moreover, instead of an alkyl group also a copolymerisable alkylene group, such as for instance a vinyl, allyl and/or (meth)acrylic group, can be used.

Processes for the preparation of the mixture according to the invention are also provided in the present invention. In a first process a) at least one quaternary organic ammonium compound and at least one water-soluble organic polymer are mixed with one another in water and the obtained aqueous mixture optionally is subsequently dried.

When the obtained aqueous mixture is dried, this may be carried out using known methods such as spray drying, freeze drying, fluidized bed drying, drum drying and/or flash drying, wherein depending on the properties of the mixture spray drying and/or drum drying are often preferred. Spraying can take place for instance by means of a spraying wheel, one- or multi-component nozzle. If necessary, the aqueous mixture can still be diluted with water, in order to obtain a suitable viscosity for spraying. The drying temperature basically has no real limits. In particular for safety considerations, however, it typically should not exceed about 200° C., in particular about 175° C. In order to achieve sufficiently efficient drying, temperatures of about 110° C. or higher, in particular of about 120° C. or higher, are often preferred.

In a further process b) at least one powdery quaternary organic ammonium compound and at least one powdery water-soluble organic polymer are mixed with one another, with the mixing of the powders preferably taking place in powder mixers, in which process other mixing processes can be used.

In again another process c) at least one liquid and/or dissolved quaternary organic ammonium compound is applied on at least one powdery water-soluble organic polymer such as for instance powdery polyvinyl alcohol, cellulose ether and/or starch ether. Suitable methods are known to the skilled person and comprise inter alia spraying, adsorption, mixing, fluidised bed drying and/or granulation.

In the processes according to the invention also further additives can be added, in which case the addition can take place during and/or after the steps a), b) and/or c). Liquid, dissolved or dispersed additives are preferably added to liquids and powdery additives are preferably added to powders or granulates.

The quaternary organic ammonium compound can be added to building materials or applied on building materials as a single component or as a mixture. As a mixture can be used the mixture according to the invention or an inorganic carrier material containing at least one quaternary organic ammonium compound. As carrier materials all known carrier materials can be used, provided that they are suitable for the adsorption of organic compounds. Preferred carrier materials contain anti-caking agents, magnesium hydro-silicates, particulate titanic oxide, pure clays, bleaching earths, activated aluminium oxide, vermiculites such as bentonite, expanded perlite, and phosphates such as Na-phosphate. Particularly preferred are silicic acids with a BET-surface of at least 50 $m^2/g$, in particular of at least 100 $m^2/g$.

Often it is advantageous when the mixture according to the invention is powdery, in particular when it is used in dry mortars. However, it can also be advantageous when the mixture according to the invention is present in the liquid state and thus can be processed straightaway, which is particularly important in 2-component systems and industrially processed building materials, such as for instance in concretes. Moreover, they can be applied to the surfaces of building materials subsequently as aqueous solution, dispersion, paste and/or creams, for instance by means of spraying and/or rolling.

The skilled person understands building materials to mean in particular mortars, concrete, plasters, coating systems, and building adhesives. The building materials typically contain one or several binders. As binders in the sense of the invention mineral and/or non-mineral binders can be used. The reduction of efflorescence typically takes place in applied building materials. By applied building material is meant in the present invention that the building material mixed with water has been brought in its final form and has achieved a minimal strength. In the case of mortars and concretes this is typically the case after expiration of the pot life or on the start of the setting according to Vicat, with both being characterised by a clear rise in viscosity, which prevents further processing.

Non-mineral binders can be present as powders, as high- and/or low-viscous liquids. Preferred are water-soluble and/or water-dispersible polymers such as film-forming dispersions and/or redispersible dispersion powders based on emulsion polymerisates and epoxide resins.

Mineral binders typically are powdery and are made up in particular of at least a) one hydraulically setting binder, in particular cement, b) one latent hydraulic binder, in particular acid blast furnace slag, pozzolanes and/or metakaolin, and/or c) one non-hydraulic binder which reacts under the influence of air and water, in particular calciumhydroxide and/or calcium oxide.

As hydraulically setting binder are preferred cement, in particular Portland cement, for instance in accordance with EN 196 CEM I, II, III, IV, and V, calcium sulfate in the form of α- and/or β-semihydrate and/or anhydrite, and/or high-alumina cement. As latent hydraulic binder can be used pozzolanes such as metakaolin, calcium metasilicate and/or volcanic slag, volcanic tuff, trass, fly ash, blast furnace slag and/or silica dust can be used, which react hydraulically in combination with a calcium source such as calcium hydroxide and/or cement. Lime in particular, mostly in the form of calcium hydroxide and/or calcium oxide, can be used as non-hydraulic binder reacting under the influence of air and water. Preferred above all are pure Portland cement-based building materials or a mixture of Portland cement, high-alumina cement, and calcium sulfate, in which case latent hydraulic and/or non-hydraulic binders may be added to both systems if so desired.

Examples of aggregates, often also called fillers, are quartz and/or carbonatic sands and/or dusts, such as for instance quartz sand and/or limestone dust, carbonates, silicates, chalk, layered silicates and/or precipitated silicas. Furthermore, light-weight fillers such as for instance hollow microspheres of glass, polymers such as polystyrene spheres, alumosilicates, silicon oxide, aluminium-silicon oxide, calcium-silicate hydrate, aluminium-silicate, magnesium-silicate, aluminium-silicate hydrate, calcium-aluminium-silicate, calcium-silicate hydrate, silicon-dioxide and/or aluminium-iron-magnesium-silicate, but also clays such as bentonite can be used, in which case the fillers and/or light-weight fillers can also have a natural or synthetically achieved color.

The mixture according to the invention is preferably used in hydraulically setting masses, in particular in concretes and dry mortars. Such dry mortar formulations in addition to the mixture according to the invention contain in particular at least one mineral binder as well as typically further mortar components which can be used in the formulation such as for instance fillers such as sand, silicates and/or carbonates, organic binders such as dispersion powder and/or polyvinyl alcohol, rheology control additives such as poly-saccharide ether, casein, superplasticisers and/or thickeners, defoamers and/or additives to control hydratation such as accelerators and/or retarders.

The mixtures according to the invention are often used as powder or granulate. Thus they can be processed in a particularly easy and economic manner into corresponding dry mortars, dry plasters and/or dry premixtures for concrete such as for instance cement, in particular modified cements. This enables a particularly good dosing and a very homogeneous distribution of the mixture in the building material and thus in the subsequently manufactured bricks, building components and in the resulting structure. These dry mixtures can then simply be mixed on site under addition of a defined amount of water and subsequently processed.

However, it is also possible to admix the mixture according to the invention as separate components in the preparation of the building material. In the case of this embodiment it is often advantageous when the building material components are mixed or kneaded with the required amount of water, with the mixture being added immediately before, during and/or after the addition of water. However, it is also possible to first add mixing water to the mixture and adding the mixture in this manner to the dry or already wet mass in the mixer.

Also dry mortar formulations which contain at least one binder and at least one mixture according to the invention are provided in the present invention, in which case the dry mortar formulations can be formulated for instance as thermal insulation mortars, sealing compounds, gypsum and/or limestone and/or cement plasters, repair mortars, tile grouts, ceramic tile adhesives, plywood mortars, mortars for mineral bonding agents, cement primers, cementitious coatings for concrete, cement-based parquet adhesives, levelling and/or trowelling compounds. The dry mortar formulations according to the invention can be used both outdoors and indoors. In addition, the powders and granulates according to the invention as well as the not-dried mixtures can be used as concrete additive and/or as additive for concrete coatings.

A further embodiment of the invention is formed by mortar or concrete containing at least one binder and at least one mixture according to the invention, wherein suitable concrete is reinforced concrete, cellular concrete, aerated concrete, foamed concrete, prefabricated components made of concrete, mortars, plasters, joint sealers, component parts made of lime sandstone, clinker, brick, porous tiles and Dutch tiles, terra cotta, natural stones, fibrated cements, screeds, clay articles, brickworks, facades, roofs, as well as constructions such as bridges, docks, residential buildings, industrial buildings and publicly used buildings such as parking garages, stations or schools, but also prefabricated parts such as railway sleepers or L-stones being particularly.

In addition to the mixture according to the invention the dry mortar formulations, mortars and/or concretes according to the invention advantageously contain a proportion of binder of about 0.5 to about 50 wt. %, in particular of about 1.0 to about 30 wt. %, a proportion of aggregates of about 30 to 99 wt. %, in particular about 50 to 98 wt. %, a proportion of water-redispersible film-forming polymer powders, often also called dispersion powders, of about 0 to 30 wt. %, in particular of about 20 wt. %, a proportion of polysaccharide ether of about 0 to 2.0 wt. %, in particular of about 1.0 wt. %, and of further components such as for instance calcium hydroxide and/or calcium oxide of about 0 to 25 wt. %, with the latter, when it is used, preferably being used in an amount of up to about 10 wt. %, in particular up to about 5 wt. %, with the amounts in each case being based on the solids content of the formulation in question.

The amount used of the quaternary organic ammonium compound or the quaternary organic ammonium compound-containing mixture typically is selected such that the reduction of efflorescence is optimal. This means that no efflorescence can be observed any more with the naked eye. However, since the building materials can differ strongly from one another for instance with regard to composition, applied layer thickness and/or climatic environment, it is advantageous when the amount for use is matched with the respective building material. Surprisingly, it was found that for the use according to the invention of the quaternary ammonium compound and mixture according to the invention the smallest amounts already suffice to clearly reduce the efflorescence behavior of the materials or eliminate it altogether. Preferably, amounts of at least about 0.0001 wt. % are used, in particular of at least about 0.001 wt. %, more preferably of at least about 0.005 wt. % and/or of at most about 5 wt. %, in particular of at most 2 wt. %, more preferably of at most about 1 wt. %, based on the dry solids of the building material, the dry mortar formulation, the mortar and/or the concrete.

The quaternary organic ammonium compounds and the mixture according to is the invention to be used in the application according to the invention are very readily miscible with building materials, in particular with building materials containing minerally setting components which are stirred with water. When the quaternary organic ammonium compound and/or the mixture according to the invention are present in the form of a powder or granulate, they typically have a very good wettability. In addition, the solubility and redispersibility, respectively, are very good, so that already on contact with water within a few seconds, in any case through light stirring, the mixture is fully dissolved or redispersed. Moreover, often only the smallest amounts of quaternary organic ammonium compounds are required, which typically is of great advantage.

The invention is explained with reference to the following Examples.

EXAMPLES

Preparation of Powders

Example 1

Preparation of Powder 1

87.5 g of a commercially available calcium/magnesium carbonate (Dolomit DR80C) were mixed thoroughly with 12.5 g benzalkonium chloride (Merck) in a mortar grinder. The result was a homogeneous powdery mixture which is readily dosable.

Example 2

Preparation of Powder 2

To 292 g of a 24% polyvinyl alcohol solution with a degree of saponification of 88 mol. % and a Höppler viscosity as 4% solution of 4 mPas 30 g of benzalkonium chloride (Merck) were added in a 500 ml glass vessel with a propeller stirrer, with stirring at 1,000 rpm at room temperature, in which process the benzalkonium chloride fully dissolved. The obtained solution was diluted with water to a Brookfield viscosity (at 23° C. and 20 rpm) of between 500 and 1,000 mPas and subsequently dried without further additives by means of conventional spray drying at an inlet temperature of 120° C. to a pale-yellow, readily water-soluble powder, in which process no fouling worth mentioning was to be observed in the spraying tower and the yield was in the normal range.

Example 3

Preparation of Powder 3

90 g of a commercially available calcium/magnesium carbonate (Dolomit DR80C) were mixed with 10 g of powder 2 (from Example 2).
B) Application-Specific Experiments with Cement-based Materials.

Example 4

35.0 parts of white Portland cement, 19.2 parts of quartz sand (0.08-0.2 mm), 41.0 parts of calcium carbonate Durcal 65, 0.3 parts of a cellulose ether (viscosity as 2% aqueous solution: 3,200 mPas), 2.0 parts of the pigment Bayferrox 110, and 1.0 part of building lime were well mixed and used as basic dry mortar recipes. Into these different powders were put in various amounts as follows from Table 1, which could easily be stirred into the mortar matrix without further special mixing processes. The recipes in each case were compounded with 32 parts of water, based on 100 parts dry formulation, with a 60 mm propeller stirrer at a rate of 950 rpm for 60 seconds, with the indicated amount of mixing water being added with stirring. After a maturing time of 3 minutes the mortar was again stirred briefly by hand and applied with a trowel to an unglased stoneware tile with a thickness of 6 mm to a size of (196 mm×50 mm), with the tiles being saturated with water immediately beforehand. Two different samples were prepared in each case, with the mortar being applied in a layer thickness of 2.0 mm with the aid of spacers.

Next, in an environmental chamber cooled to 7° C. the specimens were immediately mounted in a container with water which was constantly heated to 20° C. The container was constructed such that specimens come to lie at least 5 cm above the water surface and have a tendency to a 45° angle. The area not covered by the specimens was covered up and lagged, so that water vapour penetrates through the carrier material into and through the specimens. After a storage period of 7 days the surface was evaluated for efflorescence optically (eyes and microscope).

TABLE 1

Application-specific Examples on the basis of a dyed cement-based trowelling mass with a layer thickness of 2.0 mm for the evaluation of efflorescence.

| Exp. No. | Basic recipe [parts by weight] | Powder No. | Powder content [parts by weight] | QAC-content [a] [wt. %] | Efflorescence |
|---|---|---|---|---|---|
| 1-a | 98.5 | N/A | 0 | 0 | very strong |
| 1-b | 98.5 | 1 | 0.4 | 0.05 | none |
| 1-c | 98.5 | 1 | 0.2 | 0.025 | none |
| 1-d | 98.5 [b] | 1 | 0.2 | 0.025 | none |
| 1-e | 100 | [c] | 0.1 | 0.1 | none |
| 1-f | 100 | [d] | [d] | 0.1 | none |

The mortar processability was good in all experiments and the mortar consistency in each case was comparable with that of the Reference example.
[a] QAC stands for quaternary ammonium compound.
[b] To the 98.5 parts by weight (pbw) of basic recipe there were additionally added 3 pbw of a commercially available ethylene-vinyl acetate dispersion powder.
[c] The powder used was Centrolex FSB (pure lecithin ex Central Soya European Lecithins GmbH & Co KG; Hamburg).
[d] Instead of a powder an aqueous solution of cetyltrimethyl ammonium chloride (Dehyquart A CA ex Cognis) was used.

The results clearly show that the samples, even when they contain very small amounts of quaternary ammonium compound, reduce efflorescence so strongly or even eliminate it altogether, that none could be observed even under the microscope. The reference sample on the other hand shows very strong efflorescence.

Example 5

28.0 parts of white Portland cement, 25.0 parts of quartz sand 0.1-0.3 mm, 8.0 parts of sand 0.7-1.2 mm, 35.0 parts of sand 1.5-2.2 mm, 0.05 parts of a cellulose ether (viscosity as 2% aqueous solution: 15,000 mPas), and 2.0 parts of the pigment Bayferrox 110 were well mixed and used as basic dry mortar recipe. The recipes were mixed in each case with 17 parts of water, based on 100 parts dry formulation, and tested in analogous manner to Example 4.

TABLE 2

Application-specific Examples on the basis of a decorative colour plaster with a layer thickness of 2.2 mm for the evaluation of efflorescence.

| Exp. No. | Basic recipe [parts by weight] | Powder No. | Powder content [parts by weight] | QAC-content [a] [wt. %] | Efflorescence |
|---|---|---|---|---|---|
| 2-a | 100 | N/A | 0 | 0 | Very strong |
| 2-b | 100 | 1 | 0.4 | 0.05 | None |
| 2-c | 100 | 2 | 0.16 | 0.05 | None |
| 2-d | 100 | 2 | 0.05 | 0.006 | None |
| 2-e | 100 | 3 | 1.6 | 0.05 | None |
| 2-f | 100 | 3 | 0.8 | 0.025 | None |
| 2-g | 100 | 3 | 0.4 | 0.012 | None |
| 2-h | 100 | 2 | 0.32 | 0.1 | None |

The mortar processability was good in all experiments and the mortar consistency in each case was comparable with that of the Reference example.
[a] see Table 1

The cited results show that even very small amounts (for instance only 0.006 wt. %, based on dry solids) of quaternary ammonium compound bring about a very strong reduction of efflorescence also in a decorative colour plaster, so that no discolorations are recognisable to the naked eye. Moreover, the other mortar properties do not change or change only very negligibly—be it in fresh mortar or in the set state.

The invention claimed is:

1. A method of reducing efflorescence in building materials containing minerally setting components which are stirred with water comprising adding or applying at least one quaternary organic ammonium compound to the building materials, wherein the quaternary organic ammonium compound is added to the building material as a mixture, with the mixture comprising at least one quaternary organic ammonium compound and at least one water-soluble organic polymer, or comprises an inorganic carrier material and at least one quaternary organic ammonium compound.

2. The method according to claim 1, wherein the mixture is a powder, a granulate, an aqueous solution, dispersion, paste or cream.

3. The method according to claim 1, wherein the water-soluble organic polymer is a synthetic polymer.

4. The method according to claim 1, wherein the water-soluble organic polymer is a natural or synthetically prepared biopolymer.

5. The method according to claim 1, wherein the at least one quaternary organic ammonium compound has the formula (1), (2) and/or (3)

$$(N^+R_1R_2R_3R_4)A^- \quad (1)$$

$$(N^+R_1R_2R_3R_4)_2A^{2-} \quad (2)$$

$$(N^+R_1R_2R_3R_4)_3A^{3-} \quad (3)$$

wherein $R_1$, $R_2$, $R_3$, and $R_4$ are organic groups with at least one C-atom and may be the same or different, and $A^-$ is a monovalent anion, $A^{2-}$ is a divalent anion, and $A^{3-}$ is a trivalent anion.

6. The method according to claim 5, wherein at least one of the organic groups $R_1$, $R_2$, $R_3$ and/or $R_4$ is at least one saturated or unsaturated $C_6$- to $C_{50}$-alkyl or heteroalkyl group, which is linear, branched, cyclic or aromatic.

7. The method according to claim 5, wherein at least one of the organic groups $R_1$, $R_2$, $R_3$ and/or $R_4$ is a saturated or unsaturated $C_1$- to $C_4$-alkyl group.

8. A process for the preparation of a building material mixture for reducing efflorescence in applied building materials, comprising a process step A for the preparation of a powder or granulate mixture selected from:

a) mixing at least one quaternary organic ammonium compound and at least one water-soluble organic polymer in water and drying the obtained aqueous mixture,
b) mixing at least one powdery quaternary organic ammonium compound and at least one powdery water-soluble organic polymer, and
c) applying at least one liquid or dissolved quaternary organic ammonium compound on at least one powdery water-soluble organic polymer, and a process step B for preparing a building material mixture comprising mixing the product from process step A with at least one binder from the group of mineral and non-mineral binders.

9. The process according to claim 8, wherein before, during, or after process step A further additives are added, and wherein liquid, dissolved or dispersed additives are added to liquids and powdery additives are added to powders or granulates.

10. A building material mixture obtained according the process of claim 8.

11. A dry mortar formulation comprising at least one binder and at least one powder or granulate mixture obtained according a process comprising a process step selected from:
a) mixing at least one quaternary organic ammonium compound and at least one water-soluble organic polymer in water and drying the obtained aqueous mixture,
b) mixing at least one powdery quaternary organic ammonium compound and at least one powdery water-soluble organic polymer, and
c) applying at least one liquid or dissolved quaternary organic ammonium compound on at least one powdery water-soluble organic polymer.

12. A mortar or concrete comprising at least one binder and at least one powder or granulate mixture obtained according a process comprising a process step selected from:
a) mixing at least one quaternary organic ammonium compound and at least one water-soluble organic polymer in water and drying the obtained aqueous mixture,
b) mixing at least one powdery quaternary organic ammonium compound and at least one powdery water-soluble organic polymer, and
c) applying at least one liquid or dissolved quaternary organic ammonium compound on at least one powdery water-soluble organic polymer.

13. The dry mortar formulation according to claim 11, wherein the content of quaternary organic ammonium compound is at least about 0.0001 wt. % and at most about 5 wt. %, based on the dry solids of the dry mortar formulation.

14. The mortar or concrete according to claim 12, wherein the content of quaternary organic ammonium compound is at least about 0.0001 wt. % and at most about 5 wt. %, based on the dry solids of the mortar or the concrete.

15. The method according to claim 1, wherein the mixture comprises further additives.

16. The method according to claim 3, wherein the synthetic polymer is a modified or unmodified polyvinyl alcohol, polyvinyl pyrrolidone, a polycarboxylate ether, or a formaldehyde condensate.

17. The method according to claim 16, wherein the formaldehyde condensate is a melamineformaldehyde condensate or a naphthalineformaldehyde condensate or sulfonated derivatives thereof.

18. The method according to claim 4, wherein the water-soluble organic polymer is a starch, starch ether, dextrin, cellulose ether, casein or soy-protein.

19. The process of claim 8, wherein in step c) applying the at least one liquid or dissolved quaternary organic ammonium compound on at least one powdery water-soluble organic polymer is by means of spraying, adsorption, mixing, fluidized bed drying or granulation.

* * * * *